United States Patent Office 3,032,958
Patented May 8, 1962

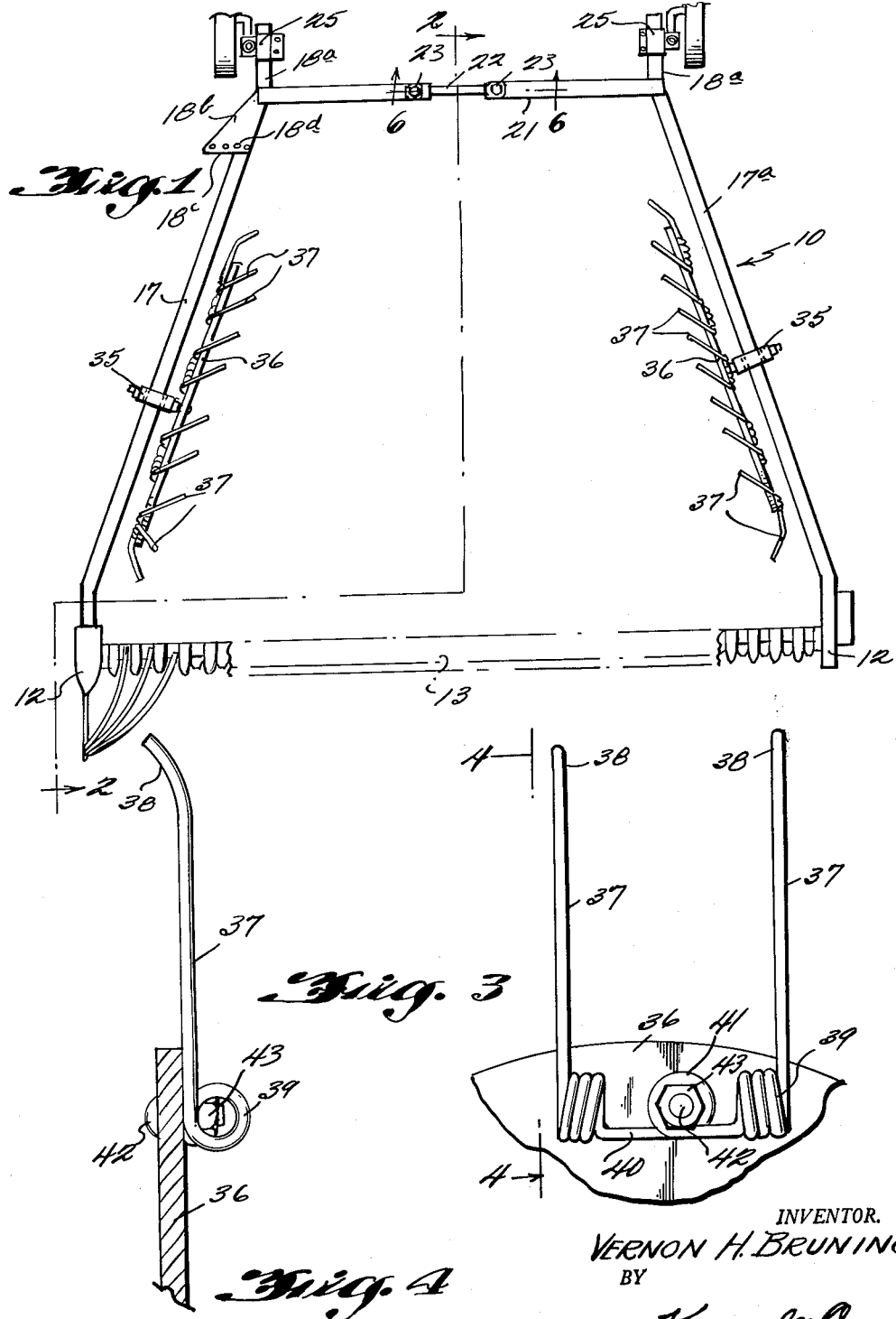

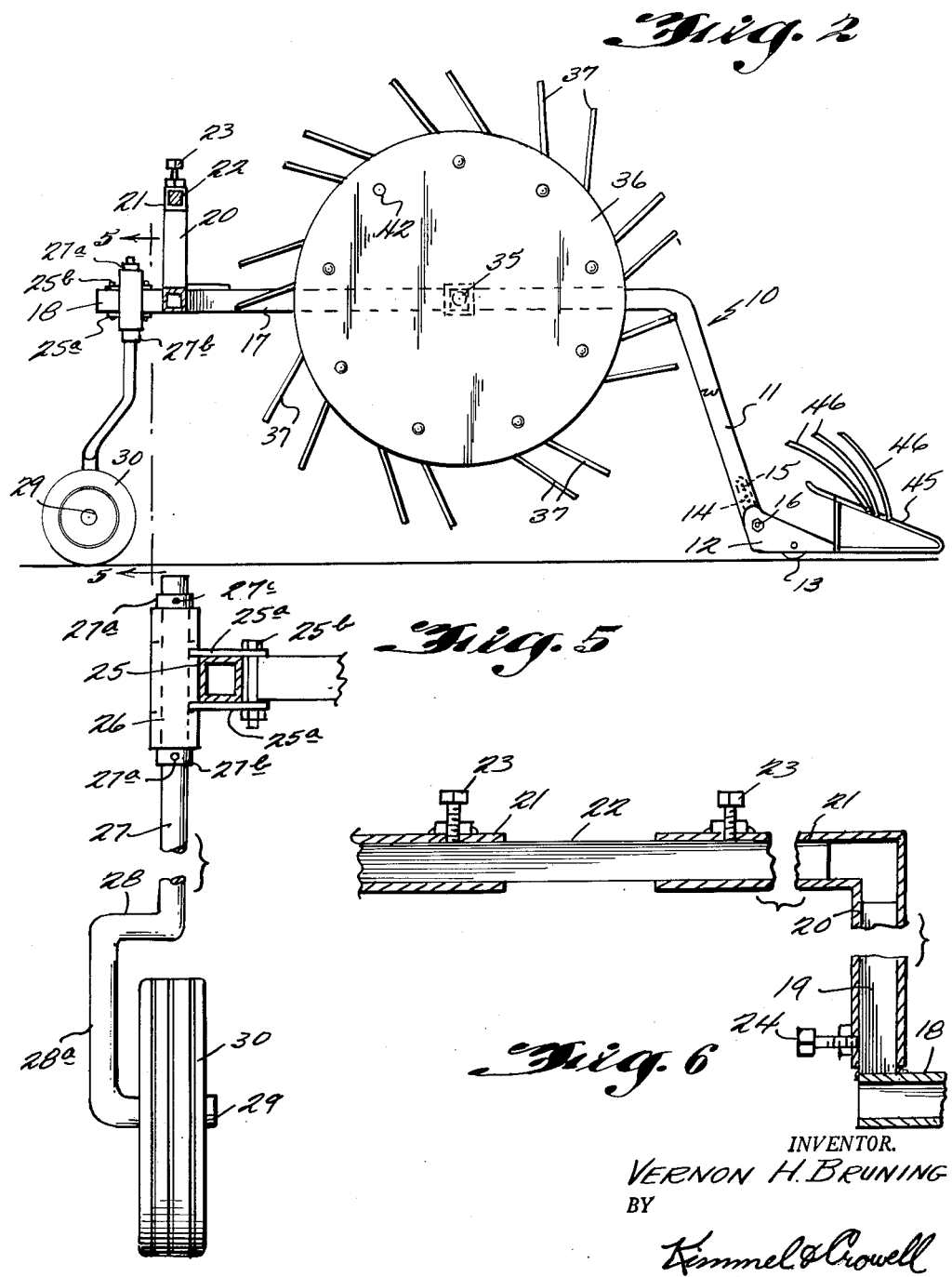

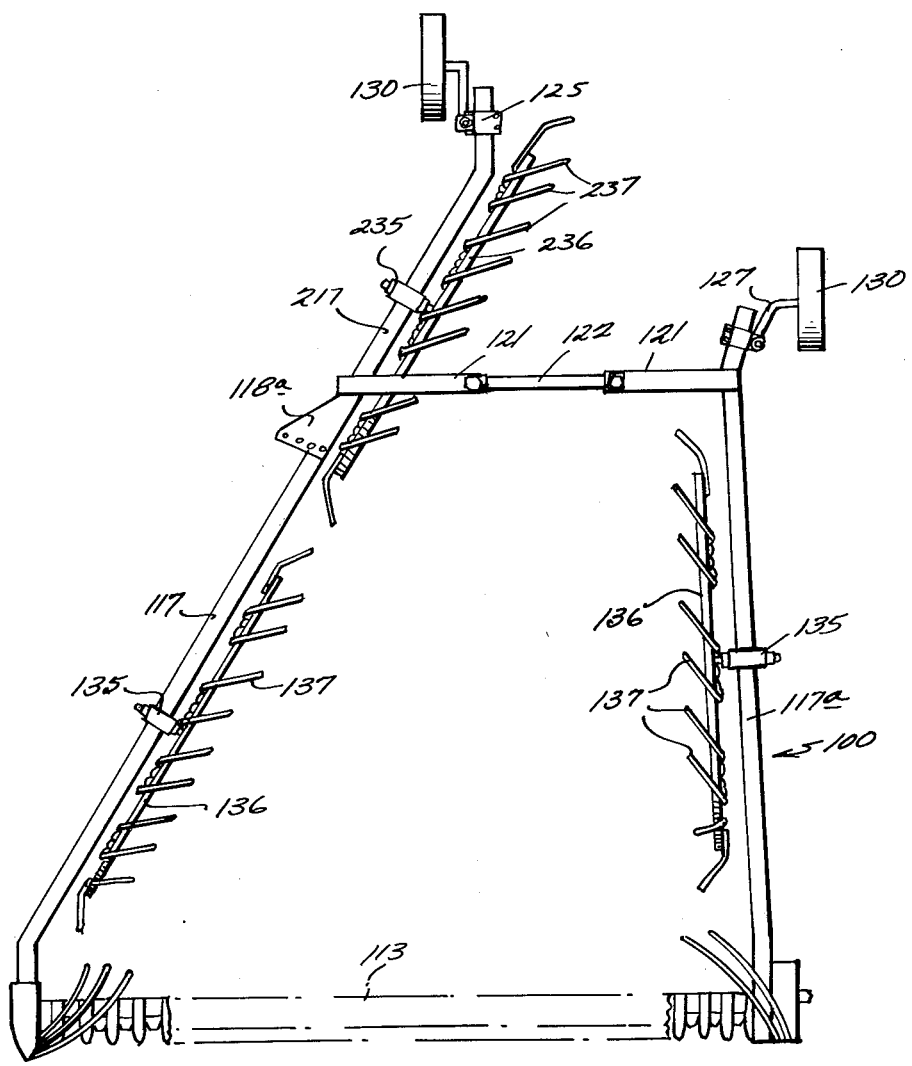

3,032,958
WINDROWING ATTACHMENT
Vernon H. Bruning, 112 Circle Drive, Holstein, Iowa
Filed Apr. 18, 1960, Ser. No. 22,775
5 Claims. (Cl. 56—192)

This invention relates to a windrowing attachment or device adapted to be attached to a cutter or mowing blade for the purpose of windrowing grain or hay or the like as it is cut, thus preparing it for combining.

A primary object of the invention is the provision of an attachment for cutters which may be readily and easily associated therewith so that freshly cut grain or the like may be formed in the windrows with a minimum of agitation to the stalks, and in such manner as to facilitate and speed the drying process.

An additional object of the invention is the provision of such an attachment provided with metal rotating disks having spring steel rods protruding from the periphery thereof, which are rotated by the reaction of the rods striking the stubble as the machine is being pulled or operated causing the discs to rotate.

An additional object of the invention is the provision of such a device wherein the spring steel rods gently move the grain into a windrow without rolling or agitating the grain in such manner as to loosen the grain from the stalk, causing loss of a substantial proportion of the same.

Still another object of the invention is the provision of a device of this character wherein the rotating disks and their associated rods are angularly disposed relative to the cutter bar in order to align and windrow the freshly cut grain with the minimum of difficulty.

A further object of the invention is the provision of such a device wherein such angularity may be varied in accordance with the types of ground or grain being cut.

Still another object of the invention is the provision of a device of this character which may be operated at substantially any speed, which may be employed in turning sharp corners, and which may be attached to a sickle blade in such manner that the blade or bar may be raised by the operator while the machine is in motion, to avoid rocks and other objects in the path of travel of the apparatus.

Still another object of the invention is the provision of such device which is sturdy and durable in construction, reliable and efficient in operation, and relatively simple and inexpensive to manufacture, assemble and install.

Still other objects reside in the combinations of elements, arrangements of parts, and features of construction, all as will be more fully pointed out hereinafter and disclosed in the accompanying drawings wherein it is shown a preferred embodiment of this inventive concept.

In the drawings:

FIGURE 1 is a top plan view of one form of windrowing attachment constructed in accordance with the instant invention shown as attached to a sickle bar.

FIGURE 2 is a sectional view taken substantially on the line 2—2 of FIG. 1 as viewed in the direction indicated by the arrows.

FIGURE 3 is an enlarged sectional view taken substantially on the line 3—3 of FIG. 1 as viewed in the direction indicated by the arrows.

FIGURE 4 is a sectional view taken substantially along the line 4—4 of FIG. 3 is viewed in the direction indicated by the arrows.

FIGURE 5 is an enlarged sectional view taken substantially along the line 5—5 of FIG. 2 as viewed in the direction indicated by the arrows; and FIGURE 6 is an enlarged sectional view taken substantially along the line 6—6 of FIG. 1 as viewed in the direction indicated by the arrows.

FIGURE 7 is a view similar to FIG. 1 showing a modified form of construction.

Similar reference characters refer to similar parts throughout the several views of the drawing.

Having reference now to the drawings in detail, the device of the instant invention is generally indicated at 10, and comprises a frame which includes a pair of upright side bars 11, which are adapted to be attached to the end pieces 12 of a conventional sickle bar 13. The latter is adapted to be attached at one end to a tractor, and actuated thereby in any desired conventional manner.

The upright portions 11 are provided at their lower extremities with plates 14, having a plurality of apertures 15 therein, as best shown in FIG. 2, which may be bolted as by means of bolts 16 to the end pieces 12, in order to vary the relative height of the frame, for a purpose to be more fully described hereinafter.

Uprights 11 terminate in substantially horizontal side pieces 17, 17a which extend rearwardly and angularly inwardly to the rear of the sickle bar 13.

Side pieces 17 and 17a are of hollow construction and terminate in aligned end members 18 and 18a. A vertically extending rectangular post or upright 19 is covered at the inner end of each member 18 and 18a. Each upright 19 extends into the vertical portion 20 of a hollow L-shaped member, the horizontal leg of which is indicated at 21. The horizontal legs 21 extend inwardly and are connected by a solid bar 22, which extends into the open end of each piece, being held in position by means of a set screw 23, the arrangement being such that by varying the relative length of the portion of member 22 which extends into each end section 21, the spacing of the side pieces 17 may be varied to accommodate different sizes of tractors. The relative height of the member 22 may be varied by the adjustment of a set screw 24, which governs the relative position of the vertical leg portions 20 on uprights 19.

End section 18 has secured thereto a triangular plate 18b provided with a series of openings 18c through a selected one of which a pin 18d may be passed into engagement with a single opening in adjacent member 17 to accommodate different settings of bore 22 and consequent variation in the angle formed between members 21 and members 17 and 17a.

A sleeve 25 is clamped by means of plates 25a and bolts 25b to each of members 18 and 18a. Each sleeve 25 carries a vertical bearing 26 through which extends a rotatable rod 27 secured in position by collars 27a and 27b, each of which carries a set screw 27c and 27d, respectively. Rod 27 below bearing 26 has a right angularly disposed offset portion 28 which terminates in a vertical offset portion 28a, the lower end of which is inturned to form a stub axle 29 which carries a swivelable caster wheel 30.

Stub axles 35 are fixedly secured to intermediate portions of frame members 17 and 17a and have mounted thereon, in greaseless bearings, for free rotation, discs 36, each disc 36 extending in substantial parallelism to the frame member 17. Each disc 36 is provided with a plurality of spring fingers 37, the tip of each finger being inturned relative to the side frame member 17, as indicated at 38. The spring fingers 37 are arranged in pairs, and each terminates in a coil spring portion 39, the portions being connected by transverse extensions 40, which terminate in a loop 41. The loop 41 is secured to the disc 36 by means of a bolt 42 and nut 43.

The discs 36 are adapted to be rotated by the engagement of the arcuate ends 38 of spring fingers 37 with the stubble left behind the cutter bar 13, and the arrangement is such that the rotation of the fingers gently moves or pushes the grain into centrally disposed windrows. The arrangement of the cross member 22 permits the device to be adapted to any conventional width of sickle, and similarly by varying the relative angularity of the side frame member 17 and their associated discs the width or thickness of the windrow may be varied. The spring fingers lay the windrow gently in an even pile with the stalks not intertwined, and the heads of the grain normally stap on top of the windrow in the sun, thus preventing rot or mildew.

Triangular frame member 45 is secured in any desired manner, as by bolting, to the forward ends of one of the terminal pieces 12 of the cutter bar 13, and carries inwardly extending rods or fingers 46, which extend inwardly and upwardly from the end portions 12 in such manner as to guide the cut grain inwardly of the ends 38 of the fingers 37 on discs 36, so that all cut grain may be engaged by the fingers, and none will pass on the outer side of the discs 36 or the frame pieces 17.

In the use and operation of the device the height of the discs 36 is suitably adjusted by the attachment of the end pieces 11 by passing the bolt 16 through a selected aperture 15. The angularity of the fingers 37 may also be adjusted, although a predetermined angular setting inclined from the radius of the discs in a direction away from the direction of rotation is generally satisfactory for a wide variety of types and heights of grain.

The sickle bar 13 is attached to a tractor or the like in a conventional manner, so that the same may be raised or lowered as usual, and operated conventionally from the power take-off of the tractor. As the tractor and its associated cutter bar are advanced through the grain, the rotating discs 36 and their associated spring fingers 37 cause the grain to be neatly and evenly moved inwardly to form even windrows without rolling or tumbling the grain, and consequent loss of the grain from the stalk. The windrows are thus laid evenly with the stalks substantially aligned and not intertwined, with the heads of the grain all exposed to the sun, so that the grain may be readily dried and is ready for the combine in a relatively short time.

Obviously, the device may be adjusted to fit any desired lengths of conventional sickle, and may be attached and detached with a minimum of time, effort and difficulty.

FIGURE 7 discloses a modified form of construction which is particularly adapted for tractors which have centered front wheels. By virtue of the modification of FIG. 7 the windrows are laid off center so that the front wheels do not pass over the previously laid windrow. In this construction a pair of side frame members 117 and 117a are connected at their front ends to a conventional sickle bar in the manner previously disclosed in connection with the foregoing modification. The member 117a extends in substantially right angled relation to the cutter bar 113, and carries a disc 136 mounted on a stub axle 135, and provided with fingers 137, all substantially identical to the previously described disc 36 and its associated mounting. The other frame member 117 extends inwardly at a relatively sharp angle, and the rear ends of the members 117a and 117 are connected by a cross bar 122 mounted in L-shaped fittings 121 also substantially identical to the members 21 and 22 previously discussed. The triangular plate 118a corresponds in structure and function to the previously discussed plate 18a.

In this modification, however, side bar 117 is provided with an extension 217, which has an additional stub axle 235, which carries a disc 236 having spring fingers 237 substantially identical to the previously described members 35, 36 and 37. By virtue of the two discs along the angular frame extension 117 the windrow is laid substantially to one side of the apparatus, or relatively close to the frame member 117a in such manner that the centrally located front wheels of a tractor of this type do not pass over the previously laid windrow. The rear of the frame is supported by means of caster wheels 130 mounted on axles 127 which are substantially identical in construction to the previously discussed wheels 30 and axles 27.

In all other respects except for the angular inclination of the members 117 and 117a, and the additional disc 236 with its associated spring fingers 237, the function and operation of the modification of FIG. 7 is substantially identical to that of the previously described modification.

From the foregoing it can be seen that there is herein provided an improved windrowing attachment which accomplishes all the objects of this invention, and others, including many advantages of great practical utility and commercial importance.

As many embodiments may be made of this inventive concept, and as many modifications may be made in the embodient hereinbefore shown and described, it is to be understood that all matter herein is to be interpreted merely as illustrative and not in a limiting sense.

I claim:

1. In a windrowing device, the combination of a frame provided with harvesting means, said frame comprising horizontal rearwardly converging portions and forwardly and downwardly extending side bars, a sickle bar secured to the ends of said side bars, freely rotatable disc-type windrowing means mounted on said converging frame portions, said windrowing means having crop engaging members disposed on the periphery thereof.

2. In a windrowing device as defined in claim 1, means to connect the free ends of said horizontal converging frame portions in spaced relation, said means comprising spaced, axially aligned, inwardly extending hollow members secured to each of said converging frame portions, and a bar having each end movably secured in telescoping relation in each of said hollow members.

3. In a windrowing device, as defined in claim 1, means on said downwardly extending side bars to vary the height of said converging frame portions and the windrowing means mounted thereon relative to the ground.

4. In a windrowing device as defined in claim 1, triangular plate members secured to said downwardly extending side bars, and inwardly, upwardly, and rearwardly extending cut grain guide rods mounted on said triangular plate members.

5. In a windrowing device, the combination of a frame provided with harvesting means, said frame including forwardly and downwardly extending side bars, a sickle bar secured to the ends of said side bars, said frame further including a first horizontal frame member extending rearwardly, in substantially perpendicular relation to said sickle bar, a freely rotatable disc-type windrowing means mounted on said first horizontal frame member, a second horizontal frame member in converging relation to said first horizontal frame member, a pair of freely rotatable disc-type windrowing means mounted on said second horizontal frame member in spaced relation to each other, said windrowing means on said first and second horizontal frame members having crop engaging members disposed on the periphery thereof, and means to connect the free ends of said horizontal frame members.

References Cited in the file of this patent

UNITED STATES PATENTS 2,893,192     Tallman _____ July 7, 1959
2,928,226     van der Lely _____ Mar. 15, 1960